United States Patent
Chhabra et al.

(10) Patent No.: US 9,465,933 B2
(45) Date of Patent: Oct. 11, 2016

(54) VIRTUALIZING A HARDWARE MONOTONIC COUNTER

(71) Applicant: Intel Corporation, Santa Clara, CA (US)

(72) Inventors: Siddhartha Chhabra, Hillsboro, OR (US); Reshma Lal, Hillsboro, OR (US); Jason Martin, Beaverton, OR (US); Daniel Nemiroff, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 13/690,111

(22) Filed: Nov. 30, 2012

(65) Prior Publication Data

US 2014/0157404 A1  Jun. 5, 2014

(51) Int. Cl.
| | |
|---|---|
| G06F 21/00 | (2013.01) |
| G06F 21/50 | (2013.01) |
| G06F 21/54 | (2013.01) |
| G06F 21/71 | (2013.01) |

(52) U.S. Cl.
CPC ............ *G06F 21/50* (2013.01); *G06F 21/54* (2013.01); *G06F 21/71* (2013.01)

(58) Field of Classification Search
CPC ......... H04L 9/00; G06F 21/86; G06F 21/50; G06F 21/54; G06F 21/71; G06F 9/5077
USPC ........... 726/22; 380/283, 286; 713/166, 167, 713/168, 193–194
See application file for complete search history.

(56) References Cited

U.S. PATENT DOCUMENTS

| | | | |
|---|---|---|---|
| 7,350,083 B2 | 3/2008 | Wells et al. | |
| 2004/0230673 A1* | 11/2004 | Lange-Pearson et al. | 709/223 |
| 2005/0108601 A1* | 5/2005 | Driediger | H04L 12/5601 714/712 |
| 2006/0187932 A1* | 8/2006 | Barthel et al. | 370/394 |
| 2006/0271796 A1 | 11/2006 | Kaimal et al. | |
| 2008/0320263 A1* | 12/2008 | Nemiroff et al. | 711/164 |

(Continued)

FOREIGN PATENT DOCUMENTS

| | | |
|---|---|---|
| KR | 10-2008-0091347 A | 10/2008 |
| KR | 10-0917290 B1 | 9/2009 |
| WO | 2014/084908 A1 | 6/2014 |

OTHER PUBLICATIONS

Sarmenta et al, "Virtual Monotonic Counters and Count-Limited Objects using a TPM without a Trusted OS", STC'06, Nov. 3, 2006, Computer Science and Artificial Intelligence Laboratory (CSAIL), Massachusetts Institute of Technology, Cambridge, MA 02139.*

(Continued)

*Primary Examiner* — Joseph P Hirl
*Assistant Examiner* — Chi Nguy
(74) *Attorney, Agent, or Firm* — Thomas R. Lane

(57) ABSTRACT

Embodiments of an invention for virtualizing a hardware monotonic counter are disclosed. In one embodiment, an apparatus includes a hardware monotonic counter, virtualization logic, a first non-volatile storage location, and a second non-volatile storage location. The virtualization logic is to create a virtual monotonic counter from the hardware monotonic counter. The first non-volatile storage location is to store an indicator that the count of the hardware monotonic counter has changed. The second non-volatile storage location is to store an indicator that the count of the virtual monotonic counter has changed.

18 Claims, 4 Drawing Sheets

(56) References Cited

U.S. PATENT DOCUMENTS

2012/0163589 A1\* 6/2012 Johnson et al. ............... 380/30
2012/0230460 A1\* 9/2012 Vyssotski et al. ............. 377/26

OTHER PUBLICATIONS

Luis F. G. Sarmenta, Marten Van Dijk, Charles W. O'Donnell, Jonathan Rhodes, and Srinivas Devdas, "Virtual Monotonic Counters and Count-Limited Objects using a TPM without a Trusted OS," STC '06, Nov. 3, 2006, ACM I-59593-548-7/06/0011, pp. 1-15.\*

International Search Report and Written Opinion received for International Application No. PCT/US2013/047257, mailed Oct. 17, 2013, 10 pages.

International Preliminary Report on Patentability received for International Application No. PCT/US2013/047257, mailed Jun. 11, 2015, 7 pages.

\* cited by examiner

METHOD 300

METHOD 400

VIRTUALIZING A HARDWARE MONOTONIC COUNTER

BACKGROUND

1. Field

The present disclosure pertains to the field of information processing, and more particularly, to the field of security in information processing systems.

2. Description of Related Art

In an information processing system, a technique to protect the security of information may include the use of a monotonic counter. For example, a monotonic counter value may be included in a message to protect the message against a replay attack.

BRIEF DESCRIPTION OF THE FIGURES

The present invention is illustrated by way of example and not limitation in the accompanying figures.

DETAILED DESCRIPTION

Figure 1:
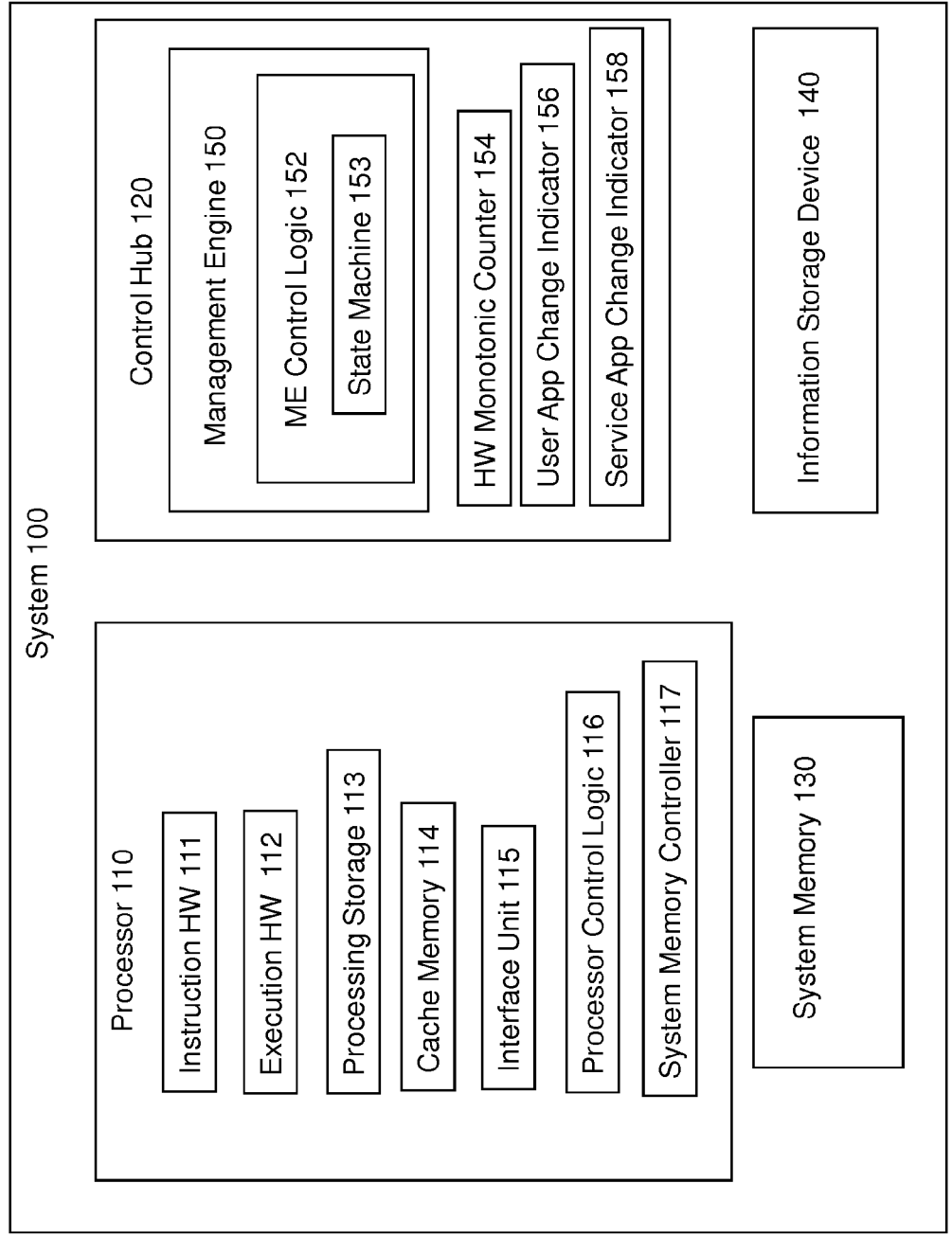
FIG. 1 illustrates a system in which a hardware monotonic counter may be virtualized according to an embodiment of the present invention.

Embodiments of an invention for virtualizing a hardware monotonic counter are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

Also, the terms "bits," "flags," "fields," "entries," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention. The term "increment" may be used to mean increase by one, but embodiments of the present invention may be possible in which "increment" may mean increase by a fixed value, and in other embodiments it may be possible to decrement or decrease instead of increment or increase. However, not every such possibility is described.

As used in the claims, unless otherwise specified the use of the ordinal adjectives "first," "second," "third," etc. to describe an element merely indicate that different instances of like elements are being referred to, and is not intended to imply that the elements so described must be in a particular sequence, either temporally, spatially, in ranking, or in any other manner.

As described in the background section, monotonic counters in information processing systems may be used in techniques to protect the security of information. However, an information processing system may have a limited number of hardware monotonic counters. Therefore, embodiments of the present invention may be desired to provide for the use of additional monotonic counters through virtualization. Embodiments of the present invention may be scalable in that the number of virtual monotonic counters available for use may be increased as desired, even when the number of hardware monotonic counters is limited. Embodiments of the present invention may also be robust, for example, by providing for correct operation even in the event of power loss so that the security of information sealed using a virtual monotonic counter is not compromised by a reset or power removal attack.

FIG. 1 illustrates system 100, an information processing system in which an embodiment of the present invention may be present and/or operate. System 100 may represent any type of information processing system, such as a server, a desktop computer, a portable computer, a set-top box, a hand-held device, or an embedded control system. System 100 includes processor 110, control hub 120, system memory 130, and information storage device 140. Systems embodying the present invention may include any number of each of these components and any other components or other elements, such as peripherals and/or input/output devices. Any or all of the components or other elements in any system embodiment may be connected, coupled, or otherwise in communication with each other through any number of buses, point-to-point, or other wired or wireless connections.

Processor 110 may represent one or more processors integrated on a single substrate or packaged within a single package, each of which may include multiple threads and/or multiple execution cores, in any combination. Each processor represented as processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller. Processor 110 may include instruction hardware 111, execution hardware 112, processing storage 113, cache memory 114, interface unit 115, and processor control logic 116. Processor 110 may also include any other circuitry, structures, or logic not shown in FIG. 1, and/or any circuitry, structures, or logic shown or described as elsewhere in FIG. 1. For example, system memory controller 117 may be integrated on the substrate or packaged within the package of processor 110.

Instruction hardware 111 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution hardware 112.

Execution hardware 112 may include any circuitry, structure, or other hardware, such as an arithmetic unit, logic unit, floating point unit, shifter, etc., for processing data and executing instructions, micro-instructions, and/or micro-operations.

Processing storage 113 may represent any type of storage usable for any purpose within processor 110; for example, it may include any number of data registers, instruction registers, status registers, configuration registers, control registers, other programmable or hard-coded registers or register files, or any other storage structures.

Cache memory 114 may represent any one or more levels of cache memory in a memory hierarchy of information processing system 100, implemented in static random access memory or any other memory technology. Cache memory 114 may include any combination of cache memories dedicated to or shared among any one or more execution cores or processors within processor 110 according to any known approaches to caching in information processing systems.

Interface unit 115 may represent any circuitry, structure, or other hardware, such as a bus unit, messaging unit, or any other unit, port, or interface, to allow processor 110 to communicate with other components in system 100 through any type of bus, point to point, or other connection, directly or through any other component, such as a memory controller or a bus bridge.

Processor control logic 116 may include any logic, circuitry, hardware, or other structures, including microcode, state machine logic, or programmable logic, to control the operation of the units and other elements of processor 110 and the transfer of data within, into, and out of processor 110. Processor control logic 116 may cause processor 110 to perform or participate in the performance of method embodiments of the present invention, such as the method embodiments described below, for example, by causing processor 110 to execute instructions received by instruction hardware 111 and micro-instructions or micro-operations derived from instructions received by instruction hardware 111.

Control hub 120 may include any logic, circuitry, or other hardware to control or facilitate the transfer of information between processor 110, system memory 130, information storage device 140, and any other components in information processing system 100, and/or any other operations or functionality of information processing system 100. Control hub 120 may include management engine 150, which may represent a processor, controller, or any other logic, circuitry, or other hardware to provide manageability, maintenance, security, and/or virtualization functionality to information processing system 100 separate from that of processor 110. For example, management engine 150 may represent a Manageability Engine to support Intel® Active Management Technology.

Management engine 150 may include management engine control logic 152, one or more hardware monotonic counter(s) 154, user application change indicator 156, and service application change indicator 158. Management engine control logic 152 may include any logic, circuitry, hardware, or other structures, including microcode, state machine logic, programmable logic, or firmware, to control the operation of management engine 150 and cause management engine 150 to perform or participate in the performance of method embodiments of the present invention.

Hardware monotonic counter 154 may include circuitry or other hardware to implement a monotonic counter according to any known approach. In one embodiment, hardware monotonic counter 154 may represent one of a set of hardware monotonic counters used, designated, or reserved for use according to embodiments of the present; for example, it may represent one of a set of five hardware monotonic counters of an Intel® Manageability Engine.

User application change indicator 156 and service application change indicator 158 may each be a non-volatile data storage element to store an indicator, such as a bit, to be used according to method embodiments of the present invention. In one embodiment, management engine control logic 152 may include state machine 153 that may use the state of user application change indicator 156 and service application change indicator 158 to ensure robustness, even in the event of power loss, as described below.

System memory 130 may include dynamic random access memory and/or any other type of medium accessible by processor 110, and may be used to store data and/or instructions used or generated by processor 110 and/or any other components.

Information storage device 140 may represent any type of non-volatile information storage device, such as flash memory or a hard disk drive.

Figure 2:
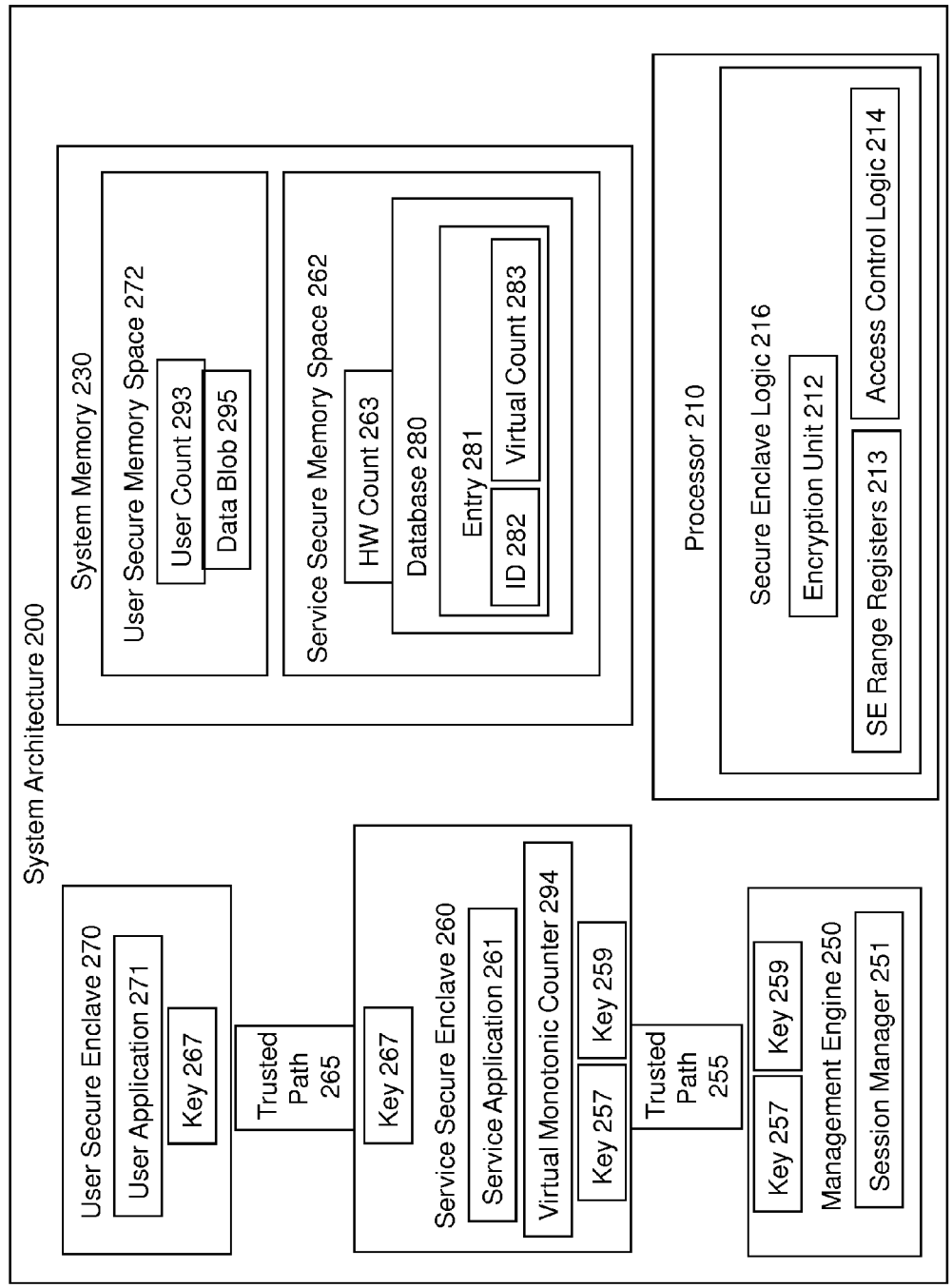
FIG. 2 illustrates a system architecture according to an embodiment of the present invention.

FIG. 2 illustrates system architecture 200 according to an embodiment of the present invention, showing service application 261 and user application 271 executing, loaded into, or otherwise present within an information processing system such as information processing system 100. In FIG. 2, service application 261 and user application 271 may each represent an application within a secured, protected, or isolated environment, such as a secure enclave as described below. For purposes of this description, each instance of such an environment may be referred to as a secure enclave, although embodiments of the present invention are not limited to those using a secure enclave as the environment for service application 261 and user application 271. In FIG. 2, service application 261 is shown in service secure enclave 260 and user application 271 is shown in user secure enclave 270.

A secure enclave may be created and maintained using instructions in the instruction set of a processor in the Intel® Core® Processor Family or other processor family from Intel® Corporation, the supporting hardware for which is represented by secure enclave logic 216 in processor 210, which may correspond to processor 110 in FIG. 1. Secure enclave logic 216 may be included within any one or more units of processor 210, such as those corresponding to instruction hardware 111, execution hardware 112, and processor control logic 116 of processor 110. Secure enclave logic 216 may include encryption unit 212, which may include any logic, circuitry, or other hardware to execute one or more encryption algorithms and the corresponding decryption algorithms.

Each secure enclave created within system architecture 200 may be allocated a secure or protected space within system memory space 230. For example, service secure memory space 262 may be allocated to the secure enclave for service application 261 and user secure memory space 272 may be allocated to the secure enclave for user application 271. Each such memory space may be created, allocated, and maintained using known virtual memory, secure enclave, or other system memory addressing techniques such that the information within each such memory space may at various times be stored within any combination of information storage device 140, system memory 130, cache memory 114, and/or any other memory or storage area within information processing system 100.

The information within the memory space of a secure enclave is accessible only to the application running in that secure enclave. For example, the information on a memory page allocated to a secure enclave may be encrypted by encryption unit 212 before being stored in system memory 130, storage device 140, or any other memory or storage external to processor 210. While stored external to processor 210, this information is protected by encryption and integrity check techniques. When this memory page is loaded into cache memory 114 by an application or process running on processor 210 within the secure enclave to which it is allocated, it is decrypted by encryption unit 212, then unencrypted information is accessible only by an application or process running within the secure enclave. These loading and access restrictions are enforced by secure enclave logic 216, which for this purpose may include secure enclave range registers 213, access control logic 214, and any other known logic, circuitry, or other hardware.

In FIG. 2, user application 271 and service application 261 may communicate with each other through trusted path 265, and service application 261 and session manager 251 running on management engine 250 may communicate with each other through trusted path 255. Trusted paths 255 and 265 may each represent a trusted path or channel implemented according to any known approach to ensure integrity and confidentiality of the communication. Establishment of trusted path 255 may include the authentication of session manager 251 and service application 261 to each other; establishment of trusted path 265 may include the authentication of service application 261 and user application 271 to each other. The authentication and/or communication protocol over trusted channels 255 and 265 may use encryption keys; for example, session manager 251 and service application 261 may use primary key 257 to derive a secondary key 259 each time service application 261 is restarted; service application 261 and user application 271 may use key 267.

Figure 3:
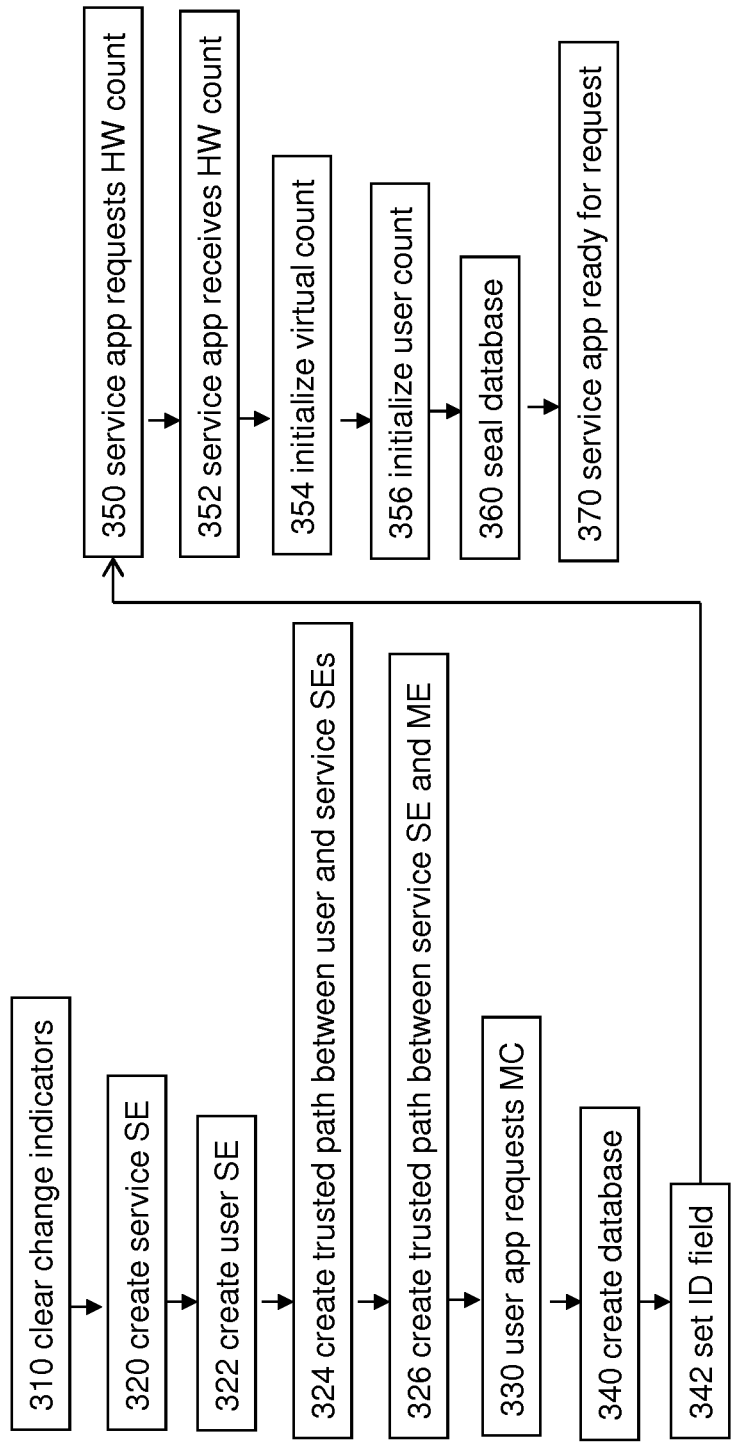
FIG. 3 illustrates a method for initiating a virtual monotonic counter according to an embodiment of the present invention.

FIG. 3 illustrates method 300 for initializing a virtual monotonic counter according to an embodiment of the present invention. Although method embodiments of the invention are not limited in this respect, reference may be made to elements of FIGS. 1 and 2 to help describe the method embodiment of FIG. 3.

In box 310 of method 300, user application change indicator 156 and service application change indicator 158 may be cleared, for example, as part of an initialization sequence or process for management engine 150.

In box 320, a secure enclave (e.g., service secure enclave 260) may be created for running a service application (e.g., service application 261). One purpose for running service application 261 may be to provide for virtualizing a hardware monotonic counter (e.g., hardware monotonic counter 154). In box 322, another secure enclave (e.g., user secure enclave 270) may be created for running a user application (e.g., user application 271). User application 271 may be run for any purpose, and it may be desired for user application 271 to use a monotonic counter for any purpose.

For example, it may be desired for user application 271 to use a monotonic counter for providing sealed storage in which to protect information (e.g., data binary large object or "blob" 295) against replay attacks. In this description, any reference to using a monotonic counter to provide sealed storage for information may include appending a current monotonic counter value to a data blob such that when the data blob is read, it may be determined whether the data has been replayed (e.g., if the appended monotonic counter value is older than the then-current monotonic counter value) or attacked (e.g., if the appended monotonic counter value is newer than the then-current monotonic counter value), or any other such known approach. Other values may also be appended to the data blob, such as a random number generated when the monotonic counter has been reset, such that when the data blob is read, it may be determined whether the monotonic counter has been reset since the data blob was stored, and/or an integrity check value. Any of these approaches may include the use of an anti-replay table, in which the monotonic counter values, random numbers, and/or integrity check values corresponding to a data blob are stored. Any such known approach may be used in embodiments of the present invention, and any reference in this description to appending a monotonic counter value to a data blob may also include techniques according to these approaches.

In box 324, a trusted path (e.g., trusted path 265) is established for bi-directional communications between user application 271 and service application 261. In box 326, a trusted path (e.g., trusted path 255) is established for bi-directional communications between service application 261 and session manager 251.

In box 330, user application 271 sends a request through trusted path 265 to service application 261 for the use of a monotonic counter.

In box 340, service application 261 creates a data structure (e.g., database 280) to be used to provide for the virtualization of a monotonic counter. Database 280 may be a data table including any number of entries, and each entry (e.g., entry 281) may include a first field (e.g., ID field 282) to store an identifier of a user application and a second field (e.g., virtual count field 283) to store the current count value of a virtual monotonic counter be allocated to the corresponding user application. In box 342, service application 261 sets ID field 282 to an identifier of user application 271 and/or user secure enclave 270; for example, it may be a value unique to user application 271 and/or user secure enclave 270 that is derived from a measurement or other report made for identity, integrity, or any other purpose.

In box 350, service application 261 sends a request through trusted path 255 to session manager 251 for the current count value of hardware monotonic counter 154. In box 352, service application 261 receives the current count value 155 of hardware monotonic counter 154. In box 354, service application 261 stores the current count value 155 of hardware monotonic counter 154 in hardware count field 263 in service secure memory space 262.

In box 354, virtual count field 283 may be initialized, e.g., to a predetermined initialization value, to the current count value of hardware monotonic counter 154, or to any other value. In box 356, the value of virtual count field 283 may be sent to user application 271 to initialize user count field 293 in user secure memory space 272, which represents the count of a virtual monotonic counter provided to user application 271 by service application 261 (e.g., virtual monotonic counter 294).

In box 360, service application 261 uses the value in hardware count field 263 to seal database 280, for example by appending the value in hardware count field 263 to a data blob representing the contents of database 280 and storing the result in service secure memory space 262.

In box 370, service application 261 is ready for a request to increment virtual monotonic counter 294. ID field 282 of entry 281 of database 280 is storing an identifier of user application 271 and/or user secure enclave 270. Virtual count field 283 of entry 281 of database 280 and user count field 293 in user secure memory space 272 are storing the same value. Hardware count field 263 in service secure memory space 262 is storing current count value 155 of hardware monotonic counter 154. Database 280 in service secure memory space 262 has been sealed with the value in hardware count field 263. User application change indicator 156 and service application change indicator 158 have been initialized to zero.

Figure 4:
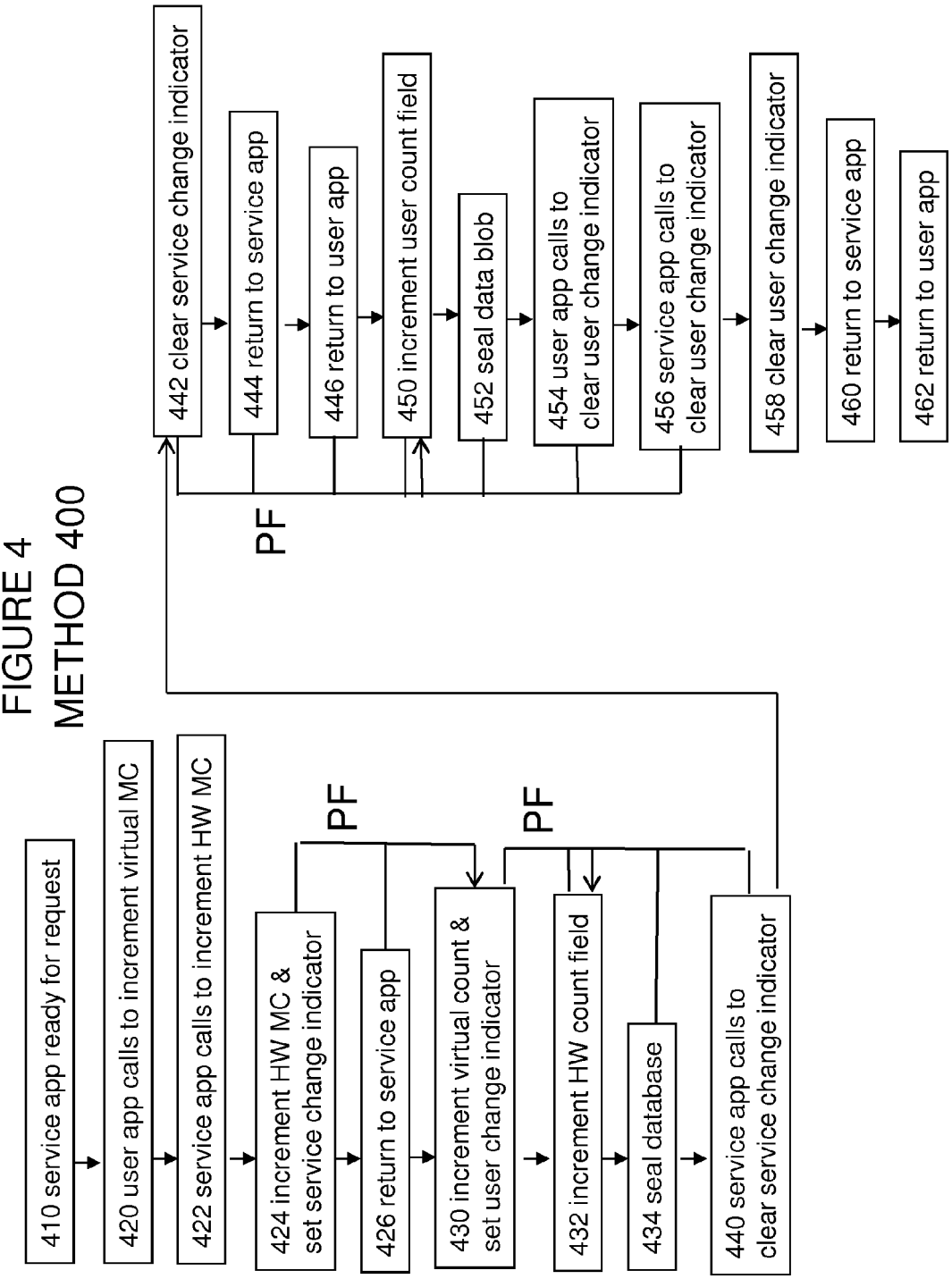
FIG. 4 illustrates a method for using a virtual monotonic counter according to an embodiment of the present invention.

FIG. 4 illustrates method 400 for using a virtual monotonic counter according to an embodiment of the present invention. Although method embodiments of the invention are not limited in this respect, reference may be made to elements of FIGS. 1, 2, and 3 to help describe the method embodiment of FIG. 4. Method may be described as continuing to a particular box in the event of power failure; in some embodiments, power failure may also be meant to include other interruptions.

In box 410 of method 400, service application 261 is ready for a request to increment virtual monotonic counter 294, for example, box 410 of method 400 may correspond to box 370 of method 300. ID field 282 of entry 281 of database 280 is storing an identifier of user application 271 and/or user secure enclave 270. Virtual count field 283 of entry 281 of database 280 and user count field 293 in user secure memory space 272 are storing the same value. Hardware count field 263 in service secure memory space 262 is storing current count value 155 of hardware monotonic counter 154. Database 280 in service secure memory space 262 has been sealed with the value in hardware count field 263. User application change indicator 156 and service application change indicator 158 have been initialized to zero.

In box 420, user application 271 calls service application 261 to increment virtual monotonic counter 294. In box 422, service application 261 calls session manager 251 to increment hardware monotonic counter 154.

In box 424, session manager 251 increments hardware monotonic counter 154 and 251 sets service application change indicator 158 to indicate that the change to hardware monotonic counter 154 may not have propagated to service application 261. In box 426, session manager 251 returns to service application 261.

In box 430, service application 261 increments virtual count field 283 and sets user application change indicator 156 to indicate that the change to virtual count field 283 may not have propagated to user application 271. In box 432, service application 261 increments hardware count field 263. In box 434, service application 261 uses hardware count field 263 to seal database 280.

In box 440, service application 261 calls session manager 251 to clear service application change indicator 158. In box 442, session manager 251 clears service application change indicator 158. In box 444, session manager 251 returns to service application 261. In box 446, service application 261 returns to user application 271.

In box 450, user application 271 increments user count field 293. In box 452, user application 271 uses user count field 293 to seal data blob 295. In box 454, user application 271 calls service application 261 to clear user application change indicator 156. In box 456, service application 261 calls session manager 251 to clear user application change indicator 156. In box 458, session manager 251 clears user application change indicator 156.

In box 460, session manager 251 returns to service application 261. In box 462, service application 261 returns to user application 271.

Service application change indicator 158 and user application change indicator 156 may be used to provide robustness in the event of a power failure. In the event of power failure from any of boxes 424 or 426, flow may continue in box 430 because it may be detected that service application change indicator 156 has been set but user application change indicator 158 has not been set. In the event of power failure from any of boxes 430, 432, 434, or 440, flow may continue in box 432 because it may be detected that service application change indicator 156 and user application change indicator 158 have been set. In the event of power failure from any of boxes 442, 444, 446, 450, 452, 454, or 456, flow may continue in box 450 because it may be detected that service application change indicator 158 has been cleared but user application change indicator 156 has been set.

In various embodiments of the present invention, the methods illustrated in FIGS. 3 and 4 may be performed in a different order, with illustrated boxes combined or omitted, with additional boxes added, or with a combination of reordered, combined, omitted, or additional boxes.

Embodiments or portions of embodiments of the present invention, as described above, may be stored on any form of a machine-readable medium. For example, all or part of method 200 may be embodied in software or firmware instructions that are stored on a medium readable by processor 110 and/or management engine 150, which when executed by processor 110 and/or management engine 150, cause processor 110 and/or management engine 150 to execute an embodiment of the present invention. Also, aspects of the present invention may be embodied in data stored on a machine-readable medium, where the data represents a design or other information usable to fabricate all of part of processor 110 and/or management engine 150.

Thus, embodiments of an invention for virtualizing a hardware monotonic counter have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
    a hardware monotonic counter;
    virtualization logic to create a virtual monotonic counter from the hardware monotonic counter;
    a first clearable non-volatile storage location to store a first indicator to indicate change to the hardware monotonic counter;
    a second clearable non-volatile storage location to store a second indicator to indicate change to the virtual monotonic counter; and logic to detect whether the first indicator has been set and the second indicator has not been set, to detect whether the first indicator and the second indicator have been set, and to detect whether the first indicator has been cleared and the second indicator has been set, to provide for correct operation of the virtual monotonic counter in the event of power loss.

2. The apparatus of claim 1, further comprising secure enclave logic to create a first secure enclave to store a count of the virtual monotonic counter.

3. The apparatus of claim 2, wherein the secure enclave logic is also to create a second secure enclave to use the count of the virtual monotonic counter.

4. A method comprising:
storing a count of a virtual monotonic counter in a data structure;
sealing the data structure using a count of a hardware monotonic counter;
setting, in response to receiving a request to increment the hardware monotonic counter, a service application change indicator in a first clearable non-volatile storage location to indicate change to the hardware monotonic counter;
incrementing the count of the virtual monotonic counter and setting a user application change indicator in a second clearable non-volatile storage location to indicate change to the virtual monotonic counter; and
detecting whether the service application change indicator has been set and the user application change indicator has not been set, to detect whether the service application change indicator and the user application change indicator have been set, and to detect whether the service application change indicator has been cleared and the user application change indicator has been set, to provide for correct operation of the virtual monotonic counter in the event of power loss.

5. The method of claim 4 further comprising storing a user identifier in the data structure to identify a user of the virtual monotonic counter.

6. The method of claim 5, further comprising sealing a data blob using the count of the virtual monotonic counter.

7. The method of claim 6, further comprising creating a service secure enclave to store the data structure.

8. The method of claim 7, further comprising creating a user secure enclave to store the data blob.

9. The method of claim 8, further comprising creating a first trusted path between the user secure enclave and the service secure enclave.

10. The method of claim 9, further comprising creating a second trusted path between the service secure enclave and a session manager having access to the hardware monotonic counter.

11. The method of claim 10, further comprising calling, by a user application running in the user secure enclave, a service application running in the service secure enclave to increment the virtual monotonic counter.

12. The method of claim 11, further comprising calling, by the service application in response to receiving a request to increment the virtual monotonic counter, the session manager to increment the hardware monotonic counter.

13. The method of claim 12, further comprising clearing the service application change indicator after the hardware monotonic counter change has propagated to the service secure enclave.

14. The method of claim 12, further comprising clearing the user application change indicator after the virtual monotonic counter change has propagated to the user secure enclave.

15. A system comprising:
a management engine including
a hardware monotonic counter,
virtualization logic to create a virtual monotonic counter from the hardware monotonic counter,
a first clearable non-volatile storage location to store a first indicator to indicate that the hardware monotonic counter has changed,
a second clearable non-volatile storage location to store a second indicator to indicate that the virtual monotonic counter has changed, and
logic to detect whether the first indicator has been set and the second indicator has not been set, to detect whether the first indicator and the second indicator have been set, and to detect whether the first indicator has been cleared and the second indicator has been set, to provide for correct operation of the virtual monotonic counter in the event of power loss; and
a processor including secure enclave logic to create a first secure enclave to store a count of the virtual monotonic counter and second secure enclave to use the count of the virtual monotonic counter.

16. The system of claim 15 wherein the secure enclave logic includes an encryption unit to encrypt information stored by a secure enclave.

17. The system of claim 15 wherein the secure enclave logic includes secure enclave range registers for allocating a secure memory space to a secure enclave.

18. The system of claim 15 wherein the secure enclave logic include access control logic to prevent access to unencrypted information cached by a secure enclave.

* * * * *